(12) United States Patent
Bennett et al.

(10) Patent No.: US 6,896,422 B2
(45) Date of Patent: May 24, 2005

(54) OPTOELECTRONIC MODULES AND METHODS OF MANUFACTURING THE SAME

(75) Inventors: Jeffrey A. Bennett, Sunnyvale, CA (US); Pete E. Kirkpatrick, San Francisco, CA (US); Sylvain M. Colin, Redwood City, CA (US); Jean-Marc Verdiell, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/357,854

(22) Filed: Feb. 4, 2003

(65) Prior Publication Data

US 2004/0151441 A1 Aug. 5, 2004

(51) Int. Cl.[7] .................................................. G02B 6/36
(52) U.S. Cl. ........................... 385/92; 385/88; 385/89; 385/94
(58) Field of Search .............................. 385/88, 89, 92, 385/94

(56) References Cited

U.S. PATENT DOCUMENTS

| | | | |
|---|---|---|---|
| 5,825,792 A | | 10/1998 | Villeneuve et al. ............ 372/32 |
| 5,857,049 A | * | 1/1999 | Beranek et al. ................ 385/91 |
| 5,963,686 A | | 10/1999 | Zheng et al. ................... 385/27 |
| 5,963,695 A | | 10/1999 | Joyce ............................ 385/88 |
| 6,088,492 A | * | 7/2000 | Kaneko et al. ................ 385/14 |
| 6,164,838 A | * | 12/2000 | Maehara et al. .............. 385/92 |
| 6,207,950 B1 | | 3/2001 | Verdiell ........................ 250/239 |
| 6,227,724 B1 | * | 5/2001 | Verdiell ......................... 385/91 |
| 6,483,969 B1 | * | 11/2002 | Yap et al. ...................... 385/52 |
| 6,490,393 B1 | * | 12/2002 | Zhou ............................ 385/37 |
| 6,625,357 B2 | * | 9/2003 | Bowen et al. ................. 385/49 |
| 6,663,294 B2 | * | 12/2003 | Crane et al. ................... 385/92 |
| 2002/0136356 A1 | * | 9/2002 | Vallin et al. ................. 378/205 |

OTHER PUBLICATIONS

Anderson, K. "Design and Manufacturability Issues of a Co-packaged DFB/MZ Module." Proceedings of 49th Electronic Components and Technology Conference (IEEE), San Diego, CA, Jun. 1–4, 1999, pp. 197–200.

* cited by examiner

Primary Examiner—Michael G. Lee
Assistant Examiner—Seung H Lee
(74) Attorney, Agent, or Firm—Hanley, Flight & Zimmerman, LLC (57) ABSTRACT

Optoelectronic modules and methods of manufacturing the same are disclosed. Some of the disclosed modules employ a tape automated bonding substrate (TAB) which is surface mounted with circuit elements. In some examples, the TAB is mounted to a rigid substrate after a fiber submount is passively positioned on the substrate. This modular manufacturing technique limits the value of yield loss. In some example modules, only one active alignment is employed to manufacture the module. Some of the disclosed modules include an optically pluggable connector.

70 Claims, 5 Drawing Sheets

OPTOELECTRONIC MODULES AND METHODS OF MANUFACTURING THE SAME

FIELD OF THE DISCLOSURE

This disclosure relates generally to optoelectronics and, more particularly, to optoelectronic modules and methods of manufacturing the same.

BACKGROUND

Optoelectronic modules are used in, for example, telecommunication systems. Optoelectronic modules frequently include a semiconductor laser mounted on a rigid substrate within a hermetically sealed housing. A circuit containing various circuit elements such as resistors, inductors, thermistors, capacitors, transistors, etc, may also be located on the substrate within the housing. The circuit is frequently coupled to an external control circuit via control lines. The control circuit sends electrical control signals into the module and senses signals from inside the module (e.g., temperature from a thermistor or transmitted power from a monitor photo diode (MPD)). The internal circuit is responsive to the control signals to regulate the operation of the laser to cause the laser to output a desired light pattern. In addition, the light output by the laser may be modulated to develop a desired communication signal.

One or more optical fibers are typically optically coupled to the laser through one or more walls of the housing. The optical fiber(s) carry the output signal(s) developed by the laser to an external optical network or the like. The fiber(s) must be carefully aligned with the laser in order to produce output signals of acceptable strength. Indeed, alignment less than a few microns is often desired to optimize the strength of the signals output by the laser.

To couple the output of the laser into the optical fiber(s), the optoelectronic module is typically provided with an optical lens located between the laser and an end of the fiber. The lens and/or the fiber may be mounted on a flexure. A flexure is a resilient metal element with one or more pairs of opposed legs separated by a central mounting area. The lens or fiber is coupled to the central mounting area of the flexure. The vertical position of the lens or fiber can be adjusted by flexing the flexure. Downwardly flexing the flexure causes the legs of the flexure to move outwardly along the substrate. When the desired position is reached, the legs of the flexure are bonded to the substrate to secure the lens or fiber against further vertical movement.

Typically, the desired position of the lens or fiber is determined through an active alignment process. In the active alignment process, the laser is energized to pass light through the lens or fiber. A power meter (PM) or other monitoring device is positioned to monitor the strength of the light signal passing through the lens or fiber. The flexure is then moved to maximize the signal received by the PM. When the lens or fiber is positioned in a vertical location wherein the signal detected by the PM is maximized, the flexure is bonded in place to secure the lens or fiber in that location.

Prior art optoelectronic modules require at least two active alignment procedures during the manufacture process (e.g., one alignment process to align the lens and the laser and one alignment process to align the lens and the fiber). Such procedures are costly in cycle time and labor requirements. Moreover, the narrow tolerances associated with positioning the optical components of the module ensure a fairly high yield loss. Because the modules typically include some very expensive components, a high module fail rate translates into high economic loss, which results in an overall increase in the price required to earn a profit from selling such modules. The communications industry, on the other hand, is demanding lower cost optical components.

DETAILED DESCRIPTION

Figure 1:
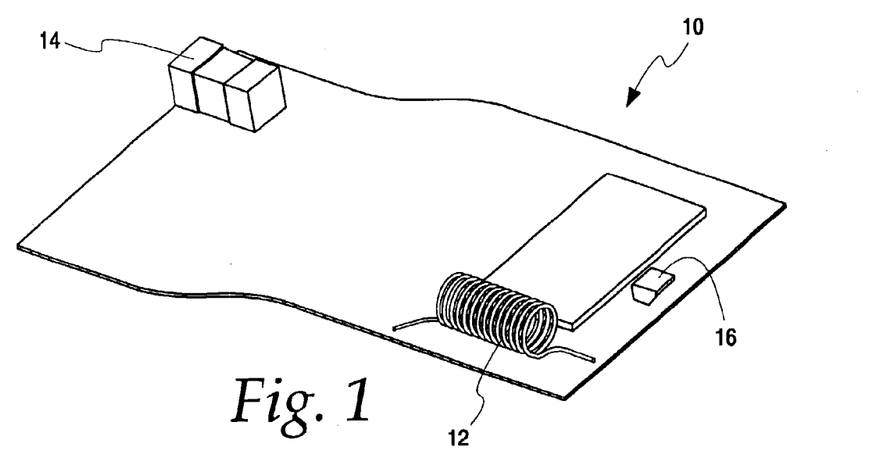
FIG. 1 is an illustration of an example tape automated bonding substrate for use in an optoelectronic module.

FIG. 1 is a perspective view of an example tape automated bonding substrate (TAB) 10 for use in an optoelectronic module such as an optical transmitter. The tape automated bonding substrate 10 is a flexible circuit board. It may, for example, be constructed of a polyimide tape. Polyimide tape is useful because it is characterized by low losses, and has high temperature and high vacuum capabilities.

In the illustrated example, copper or other conductive metal lines are printed on the tape 10 to form a desired circuit in a known manner. One or more elements 12 may then be imbedded in the TAB 10. Since the element(s) 12 imbedded in the TAB 10 do not have high precision placement requirements, the element(s) may be placed on the TAB 10 using a conventional, high volume electronics manufacturing technique such as surface mount technology. The element(s) 12 may be passive components such as, for example, a resistor, a capacitor and/or an inductor, which may, for example, form an RF compensation circuit. Additionally, the element(s) 12 may, include a laser driver 14 and/or a monitor photo diode (MPD) 16. The MPD 16 may be used, for example, to monitor the operation of a laser. Once assembled, the TAB 10 and the circuit(s) it carries may be tested. If a defect is found, the TAB 10 can be discarded before it is joined with more expensive components of the optoelectronic module thereby minimizing economic losses.

In the illustrated example, a substantially rigid substrate 20 is assembled in parallel with the assembly of the TAB 10.

Figure 2:
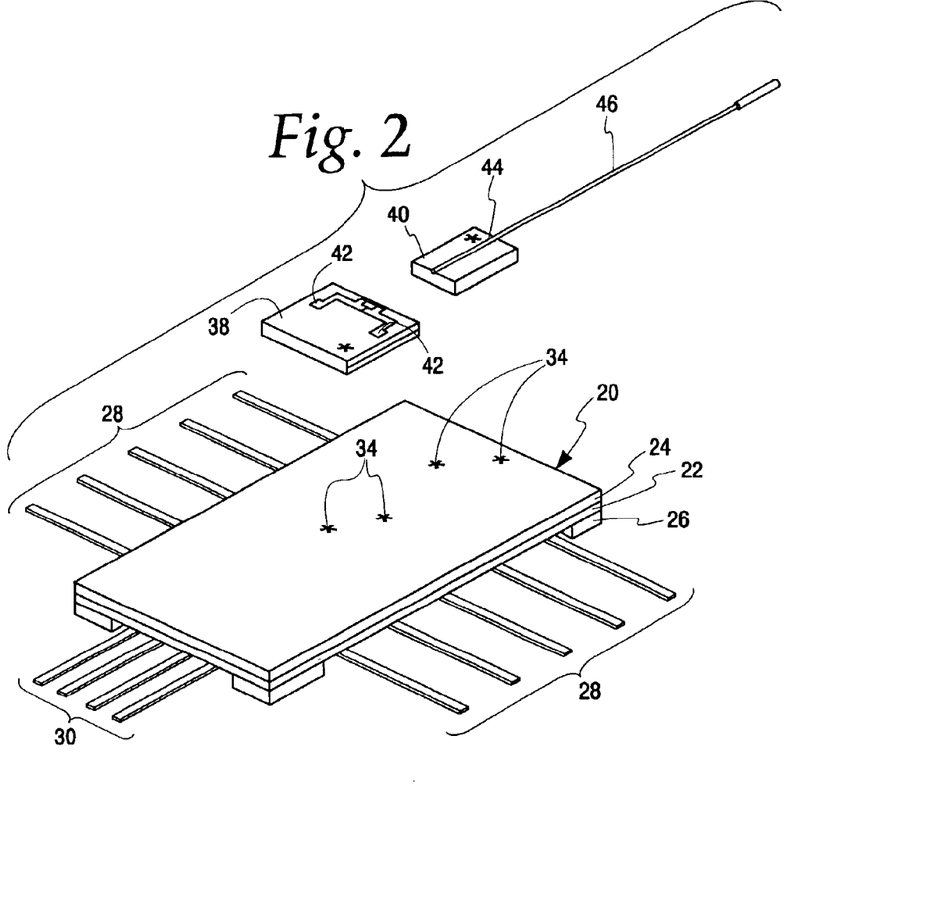
FIG. 2 is an exploded view of a ceramic substrate, a laser submount and a fiber submount.

In the example of FIG. 2, the substrate 20 is a high speed RF ceramic substrate. The substrate 20 of FIG. 2 includes multiple layers for enhanced connectivity. A middle layer 22 is printed with copper or other conductive metal circuit lines (not shown). The upper layer 24 of the ceramic substrate 20 is penetrated by vertical conductors to connect leads from the printed circuit in the intermediate layer 22 of the substrate 20 to one or more elements mounted to the top surface of the substrate 20. Similarly, the lower layer 26 of the ceramic substrate 20 is penetrated by vertical conductors to connect conductors underneath the substrate 20 to desired locations of the printed circuit carried by the middle layer 22. For instance, in the example of FIG. 2, ten DC connectors 28 are coupled to the lower layer 26 of the substrate 22 to supply DC control signals and/or power to one or more elements mounted on top of the substrate 20. Additionally, in the example of FIG. 2, four connectors 30 are coupled to the lower layer 26 of the substrate 22 to provide a high speed interface (e.g., 10 gigabits per second (Gb/s)) for controlling one or more components coupled to the surface of the substrate 20. The upper and lower layers 24, 26 may include horizontal lines as well as vertical lines for even greater interconnectivity options.

In the illustrated example, the substantially rigid substrate 20 is provided with one or more fiducial marks 34 to facilitate high precision passive placement of components on its upper surface. As used in this patent, "passive placement" refers to any placement or mounting process which operates without the benefit of activating a laser carried by the optoelectronic module. In contrast, when used in this patent, "active alignment" refers to any alignment process wherein a laser is activated and a measured output of the activated laser is used as a feedback signal indicating a degree of alignment of the object being placed. By way of example, a machine vision based placement process that uses fiducial marks (e.g., marks 34) as indicators to precisely locate components on the substrate 20 is a passive placement technique as long as a measured output of a laser is not being used as a control signal in that placement. Persons of ordinary skill in the art will readily appreciate that some robots equipped with machine vision can place an element with an accuracy of about 10 microns. However, as explained below, this level of accuracy is not always sufficient. When greater placement accuracy is necessary or desired with respect to, for example, components optically coupled to a laser, an active placement technique may be used.

Figure 4:
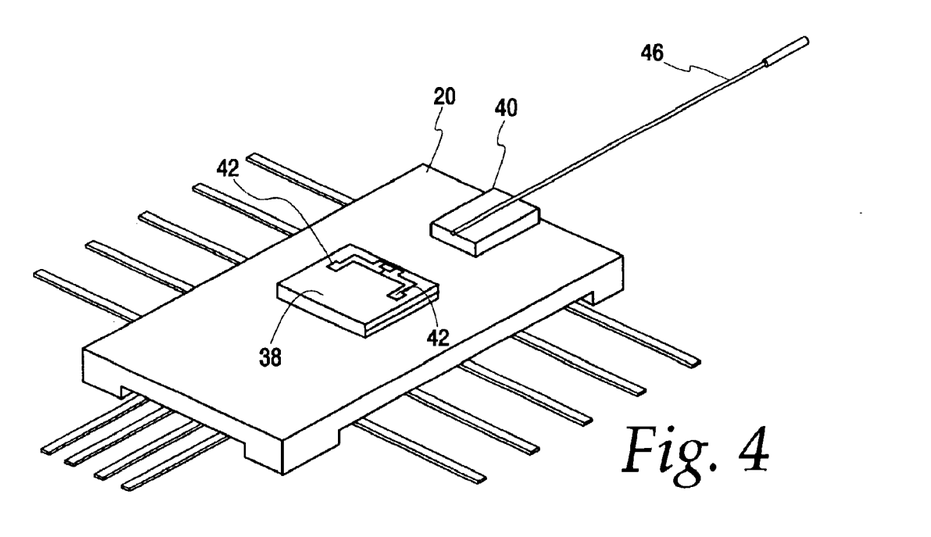
FIG. 4 is a perspective view of the substrate of FIG. 2 shown with the laser substrate and fiber submount secured thereto.

In the example of FIGS. 2 and 4, a laser submount 38 and a fiber submount 40 are located on the upper surface of the substrate 20. One or both of the laser submount 38 and the fiber submount 40 could be integrally formed with the substrate 20. However, in the illustrated example, both the laser submount 38 and the fiber submount 40 are separate elements that are passively placed on the substrate 20. For example, the fiducial marks 34 in the example of FIG. 2 may be used by a robot having machine vision capability to precisely mount the laser submount 38 and/or the fiber submount 40 on the upper surface of the substrate 20 as shown in FIG. 4. The laser submount 38 and/or the fiber submount 40 of FIG. 2 are fastened (e.g., soldered) to the substrate 20 after being passively mounted to the substrate 20.

The laser submount 38 may be, for example, a ceramic plate which is printed with conductive metal lines to form an RF circuit. The laser submount 38 may be a single layer plate as shown in FIG. 2, or alternatively, it may include multiple layers for enhanced interconnectivity as explained in connection with the above discussion of the substrate 20. Depending upon the intended application, the laser submount 38 may be dimensioned to carry a laser, one or more optical elements, one or more integrated circuits, and/or one or more passive circuit components. In the illustrated example, the laser submount 38 is intended to support a laser. Therefore, the laser submount 38 includes probe pads 42 which are electrically coupled to the position where the laser is intended to be placed, but are located such that they can be contacted after the laser is positioned. In this way, suitable control signals can be applied to the probe pads 42 after a laser is mounted to the laser submount 38 to test the laser. As discussed below, the probe pads 42 also operate as RF interconnection pads for soldering the TAB 10 to the laser submount 38 after the laser and other components carried by the substrate 20 have been tested and found to be operational. This modular assembly and testing process reduces yield loss in the event of defective components.

Figure 3:
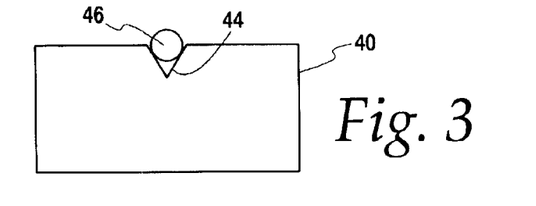
FIG. 3 is a schematic illustration showing the V-groove of the fiber submount in cross-section.

In the example of FIG. 2, the fiber submount 40 includes a v-groove 44 for receiving an optical fiber 46. The v-groove, extends from one end of the fiber submount 40 to the other and functions to hold the fiber 46 in a fixed position relative to the laser submount 38 throughout the life of the optoelectronic module. As shown in the cross-sectional view of FIG. 3, the v-groove 44 is formed in the top surface of the submount 40. For example, the fiber submount 40 may be a silicon plate and the v-groove 44 may be etched into the silicon. As also shown in FIG. 3, the v-groove 44 and fiber 46 are dimensioned such that the fiber 46 may be securely mounted in the v-groove 44. The fiber 46 may be secured in the v-groove using glue or any other conventional chemical or mechanical fastener. When so secured, one end of the fiber 46 is positioned to receive light from an optical source. Thus, the fiber submount 40 is carefully aligned with the laser submount 38. If the fiber submount 40 and/or the laser submount 38 is separate from the rigid substrate 22 as shown in FIG. 2, passive placement using the fiducial marks 34 is sufficiently accurate for most applications.

A laser 50 is passively mounted to the laser submount 38. In the case of a laser submount 38 which is separate from the substrate 20, the laser 50 may be mounted to the laser submount 38 either before or after the laser submount 38 is passively mounted to the substrate 20. A thermistor (not shown) and/or an MPD (not shown) may be mounted with the laser 50. The MPD could be used in testing the laser 50. To this end, as stated previously, when mounted on the laser submount 38, the laser 50 is electrically coupled to RF pads 42 which permit excitation of the laser 50. Thus, the laser 50 may be tested after mounting on the submount 38, but prior to complete assembly of the module to reduce yield loss in the event the laser or its mount proves to be defective.

Figure 5:
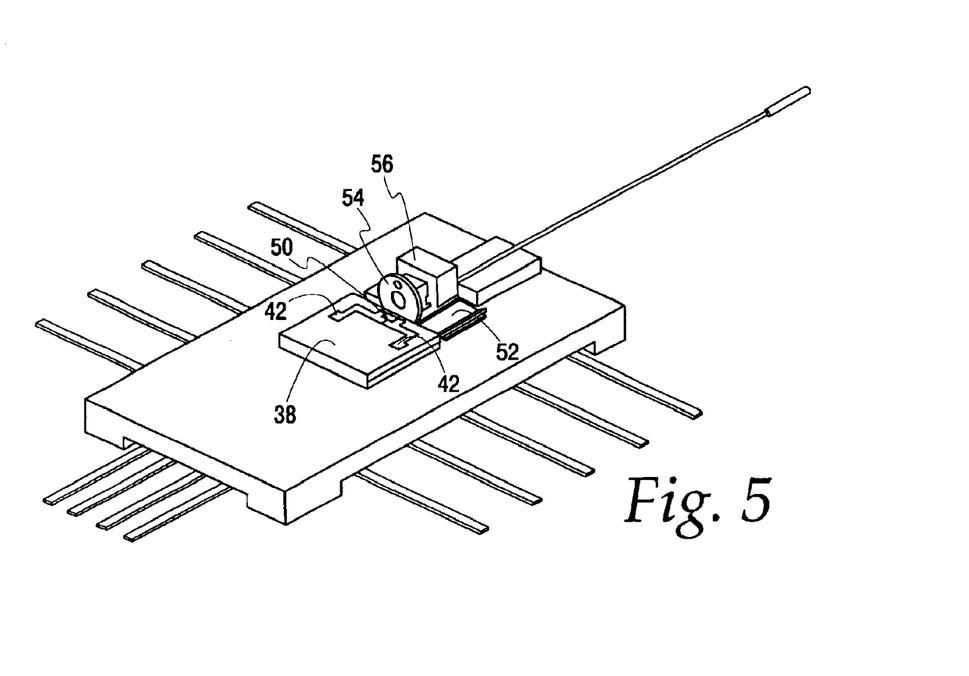
FIG. 5 is a view similar to FIG. 4, but showing a flexure carrying an optical lens and an isolator mounted to the substrate.

After the laser 50 is mounted to the substrate 20 via the laser submount 38, and the optical fiber 46 and the fiber submount 40 are mounted to the substrate 20, a flexure 52 is positioned on the substrate 20 as shown in FIG. 5. As shown in FIG. 4, the substantially rigid substrate 20 is relatively sparsely populated prior to the addition of the flexure 52. This sparseness allows easy access to generally locate the flexure 52 in the desired location using a robot having machine vision. However, while placing the flexure 52 in the generally desired location is an acceptable start, the accuracy of such a machine vision placement is not sufficient to maximize waveguide to waveguide coupling between the laser 50 and the optical fiber 46. Instead, as explained below, an active alignment process is utilized after the passive alignment process places the flexure 52 in the generally desired loction on the substrate 20.

In the example of FIG. 5, the flexure 52 carries an optical lens 54 and an isolator 56. The combination of the flexure 52 and the lens 54 is sometimes referred to as a micro-optic flexure assembly (MOFA). The lens 54 functions to steer and focus light output by the laser 50 into the exposed end of the optical fiber 46 mounted in the v-groove 44 of the fiber submount 40. The isolator 56 functions to prevent light from flowing in a predetermined direction. In particular, the isolator 56 ensures that light from the lens 54 flows out of the optoelectronic module, but that light reflected from the end of the fiber 46 does not re-enter the laser 50.

As stated above, the flexure 52 is mounted to the substrate 20 via an active alignment process. In the illustrated example, after positioning the flexure 52 at the desired general location of the substrate 22, the laser 50 is activated via the probe pads 42 and an optical coupling efficiency between the laser 50 and the fiber 46 is measured. While this monitoring of the optical coupling efficiency occurs, the flexure 52 is flexed to adjust a vertical position of the lens 54. The flexing of the flexure 52 may be accomplished by increasing and/or decreasing an external pressure applied to the flexure 52. The flexure 52 and lens 54 are moved up and/or down to substantially maximize the optical coupling efficiency of the laser 50 through the optical lens 54 to the fiber 46. When a position of the flexure 52 that substantially achieves a maximum output through the lens 54 is identified, the flexure 52 is soldered to the substrate 20 to thereby hold the lens 54 in the determined position and ensure that the module outputs a substantially optimum level of light during operation.

Unlike prior art manufacturing techniques, in the example of FIGS. 1–7, only one active alignment is required to manufacture the optoelectronic module. Specifically, the active alignment of the lens 54 with the laser 50 is the only active alignment employed to assemble the optoelectronic module of FIGS. 1–7. This single active alignment with fiducial pre-alignment through, for example, a robot with machine vision, and optical isolation as provided by the isolator 56 is adequate for most low power applications.

Figure 6:
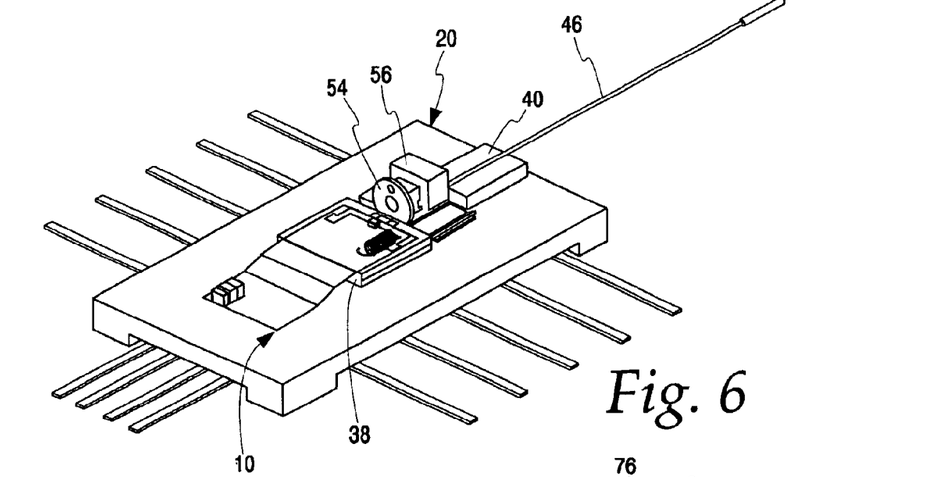
FIG. 6 is a view similar to FIG. 5 but showing the example tape automated bonding substrate of FIG. 1 mounted to the substrate and the laser submount, and a laser mounted to the laser submount.

With the TAB 10 and its circuitry having passed one or more tests, one or more of the components mounted to the rigid substrate 20 having passed one or more tests, and the laser 50 and lens 54 having been actively aligned, the TAB 10 is now mounted to the rigid substrate 20. In the example of FIG. 6, the TAB 10 is mounted to the substrate 20 after the fiber submount 40 and flexure 52 have been mounted to the rigid substrate 20. In particular, one end of the TAB 10 is mounted (e.g., soldered) to the substantially rigid substrate 20, and the opposite end of the TAB 10 is mounted (e.g., soldered) to the RF interconnection pads 42 on the laser submount 38. The securement of the TAB 10 to the substrate 20 and laser submount 38 may be achieved via an automated, high volume TAB process. The modular approach to constructing the module facilitates re-working of the circuit or devices on the flex circuit 10 should a defect be identified.

If desired, the TAB 10 may be replaced with a solid state riser or a solid state riser monolithically integrated with the substrate 20. This approach, however, inherently lacks some of the advantages of parallel assembly associated with using the TAB 10 described above.

Figure 7:
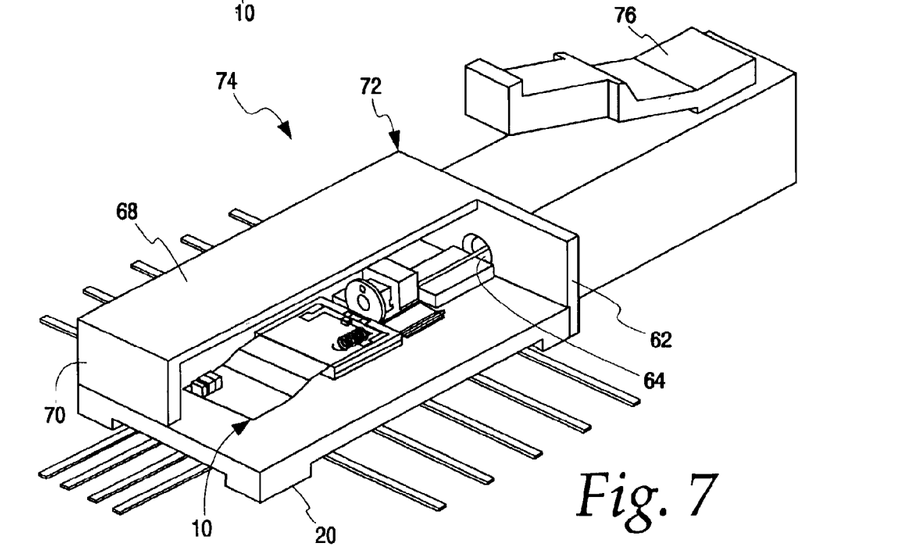
FIG. 7 is a view similar to FIG. 6, but including a partially cut away housing and a pluggable connector.

As shown in FIG. 7, with the electronics and optics substantially assembled, an end plate 62 defining a bore 64 is threaded onto the fiber 46 and the end plate is soldered to the substrate 20. A solder seal is then placed in the bore 64 around the fiber 46. A lid 68 and an opposite end wall 70 is soldered onto the first end wall 62 and substrate 20 to form a hermetic housing 72 around the optics and electronics of the optoelectronic module 74. The upper surface of the substantially rigid substrate 20 is located within the housing 72, as is the laser 50 coupled to the substantially rigid substrate 20, the fiber submount 40 defining the v-groove 44, the flexure 52, and the optical lens 54.

An optically pluggable connector 76 is coupled (e.g., glued) to the housing 72 as shown in FIG. 7. The connector 76 carries the optical fiber 46. In particular, an end of the fiber 46 is secured in a mount within the connector 76 in a position such that, insertion of the male optical connector 76 into a female optical receptacle carrying a waveguide (not shown) results in alignment and, thus, optical coupling between the fiber 46 and the fiber/waveguide carried by the female connector. The inclusion of a pluggable connector 76 is made possible by the use of the fiber submount 40 and the v-groove 44. In particular, the secure attachment of the fiber 46 in the v-groove 44, permits connection of the optical connector 76 without jeapordizing the alignment of the fiber 46 and the internal optics of the module 74. Persons of ordinary skill in the art will readily appreciate that if the pluggable connector 76 is not desired, it can be eliminated in favor of a pigtail connection or any other conventional connection mechanism.

Figure 8:
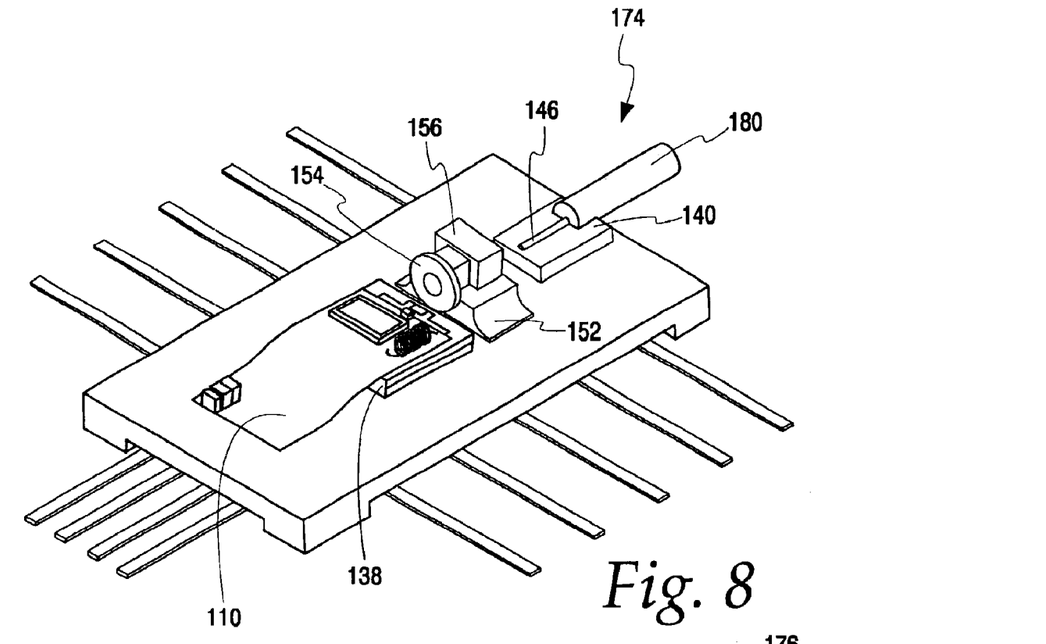
FIG. 8 is a perspective view similar to FIG. 6, but showing an alternative module including a ferrule mounted to the fiber submount.

Another example optoelectronic module 174 is shown in FIG. 8. The module 174 of FIG. 8 shares many structures in common with the optoelectronic module 74 of FIGS. 1–7. In the interest of brevity, the following discussion will focus on the differences between the modules 74, 174, and the discussion of structures that are substantially the same in the two modules 74, 174 will not be repeated. Instead, for a full discussion of those substantially similar structures, the interested reader is referred back to the earlier description made in connection with FIGS. 1–7. To facilitate this process, like structures appearing in the example of FIG. 8 are labeled with the same reference numerals employed in FIGS. 1–7, but increased by 100.

Like the example module 74 of FIGS. 1–7, the example optoelectronic module 174 shown in FIG. 8 includes a substantially rigid substrate 120, and a laser submount 138 carried by the substantially rigid substrate 120. Also like the module 74, the module 174 includes a tape automated bonding (TAB) substrate 110 mounted to the substrate 120 and to the laser submount 138. The optoelectronic module 174 also includes a fiber submount 140 which defines a v-groove 144 that is dimensioned to receive an optical fiber 146 and that is fabricated to close spatial tolerance with respect to the laser placement fiducials. Also like the module 74 of FIGS. 1–7, the example module 174 of FIG. 8 includes a flexure 152 carrying an optical lens 154 and an isolator 156.

Figure 9:
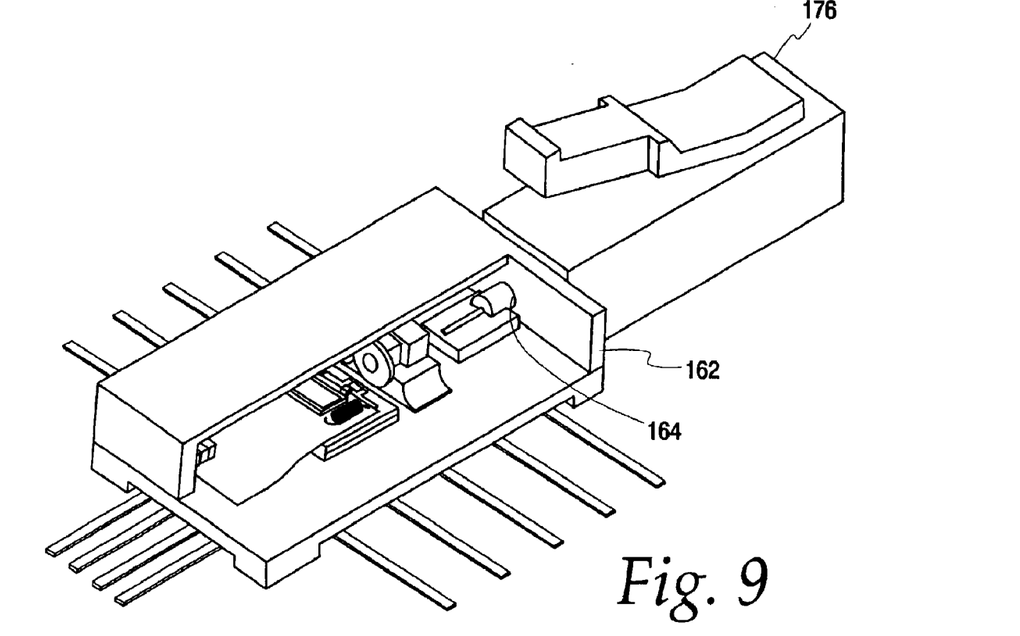
FIG. 9 is a view similar to FIG. 8, but including a partially cut away housing and a pluggable connector.

In contrast to the example of FIGS. 1–7, the optical fiber 146 of the example optoelectronic module 174 is located in a feedthrough 180. As shown in FIG. 9, the feedthrough 180 is located in a bore 164 defined in a wall 162 of the optoelectronic module 174. In the example of FIGS. 8–9, the feedthrough 180 is a ferrule which receives the optical fiber 146 and is mounted (e.g., soldered) to the fiber submount 140 with the optical fiber 146 extending several millimeters out of the ferrule 180 into the v-groove 144 of the fiber submount 140. The extension of the fiber 146 out of the ferrule 180 enables passive alignment of the laser and the fiber tip such that only one active alignment is required to achieve coupling from the laser to the fiber. Alternatively, the fiber submount 140 and its v-groove 144 may be eliminated, and the optical fiber truncated at the ferrule 180 for space savings. However, this latter approach incurs a reduction in the precision of the passive alignment of the fiber 146 and may result in the need for additional active alignment procedures.

Regardless of whether the fiber submount 140 and v-groove 144 are eliminated, the ferrule 180 is secured in the bore 164 of the wall 162. A solder plug may be used to secure the ferrule 180 in the bore 164 and to form a hermetic seal.

In the example of FIG. 9, the ferrule 180 forms a core of a pluggable optical connector 176.

Although the above examples utilized a single optical lens 54, 154 mounted to a flexure 52, 152, persons of ordinary skill in the art will readily appreciate that other optical lens combinations may also be employed. For example, a second flexure (not shown) carrying a second optical lens (not shown) may be mounted to the substrate 20, 120. In an example of such an approach, the first flexure (e.g., flexure 52) carries a relatively strong lens 54 to steer the laser light toward the optical fiber 46, and the second flexure carries a relatively weak lens to compensate for post weld shifting of the first flexure 52 to thereby achieve higher coupling efficiency between the laser and the fiber 46. In an example employing two flexures and two lenses in this manner, the first flexure/lens may be actively aligned with the laser before the second flexure/lens is actively aligned with the same laser.

Figure 10:
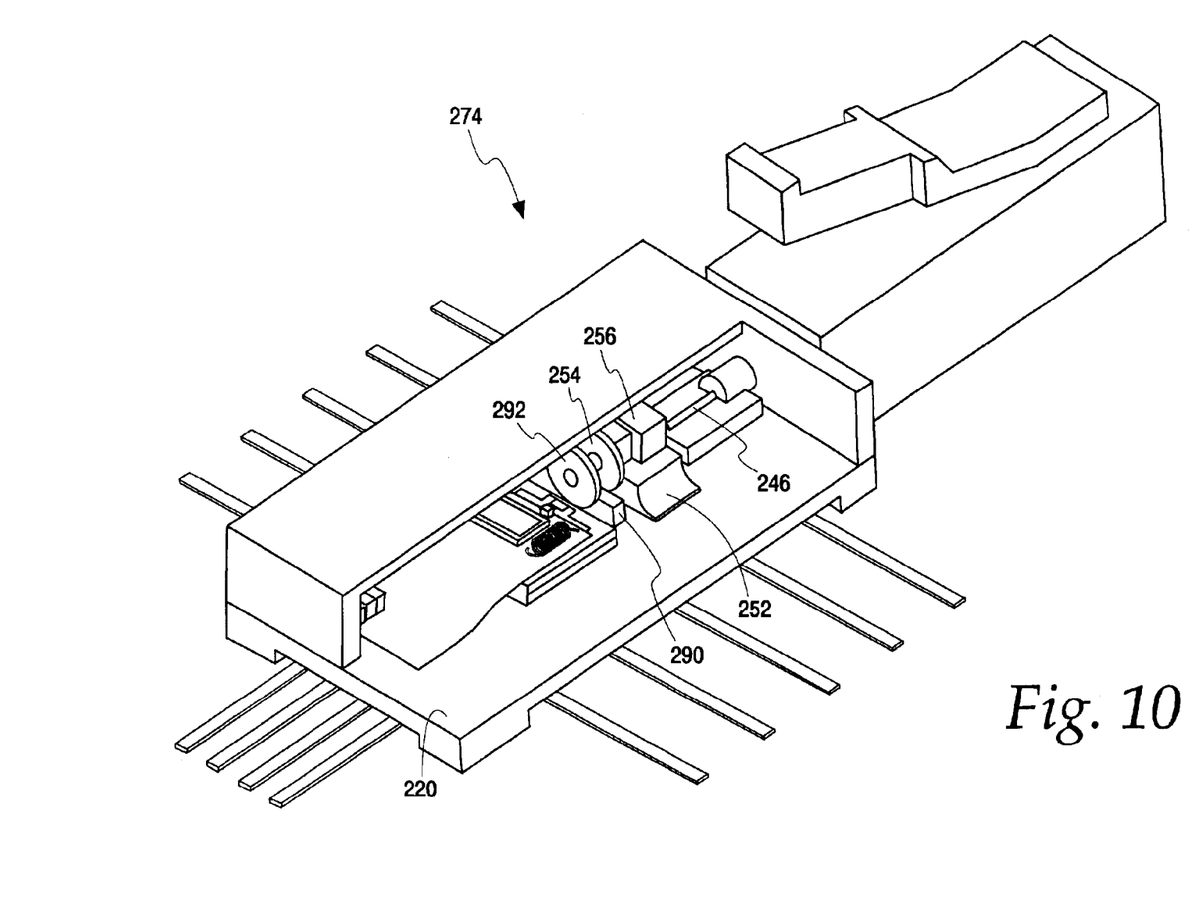
FIG. 10 is a view similar to FIG. 9, but illustrating an alternative module including a first lens mounted on a fixture and a second lens mounted on a flexure.

Another alternative optoelectronic module 274 is shown in FIG. 10. As with the example module 174, the example module 274 has many structures in common with the example module 74 of FIGS. 1–7. Therefore, in the interest of brevity, the reference numeral convention employed with respect to the example module 174 is employed in describing the example module 274 of FIG. 10, except the reference numerals of like structure from the module of FIGS. 1–7 are increased by 200 in FIG. 10.

The module 274 is very similar to the module 174. However, unlike the module 174, the module 274 includes a fixed mount 290 carrying an optical lens 292. The fixed mount 290 is mounted to the substantially rigid substrate 220 via a passive placement technique. A flexure 252 carrying a second lens 254 and an isolator 256 is mounted behind the fixed mount 290. The first lens 292 is a relatively strong lens to steer laser light toward the optical fiber 246, and the second lens 254 is a relatively weak lens to fine tune the steered laser beam to thereby achieve higher coupling efficiency between the laser and the fiber 246.

In still another alternative example, a relatively strong lens and a relatively weak lens are mounted in alignment on the same flexure (not shown).

From the foregoing, persons of ordinary skill in the art will readily appreciate that example optoelectronic modules and example methods of manufacturing the same have been disclosed. Some of the disclosed manufacturing methods are modular in that various components of the optoelectronic module being constructed are assembled independently of other components of that module. This modular approach allows testing of complex devices such as, for example, a laser driver, in many instances without requiring a commitment of high value components to the assembly under test. Thus, if a failed component is detected via testing, that component may be discarded without disposing of other working components. As a result, the value of yield loss is lowered.

The disclosed modules and methods enjoy many advantages. For instance, some disclosed example methods reduce active alignment cycle time, active alignment capital, active alignment labor, and yield loss by reducing the number of active alignment processes required to manufacture an optoelectronic module to one active alignment. By way of another example, some disclosed methods utilize parallel/modular assembly techniques thereby simplifying manufacturing logistics and reducing the value of yield loss. These modular/parallel assembly techniques are selected to separate coarse placement requirements from fine placement requirements to allow usage of optimized manufacturing techniques to separately meet each of those requirements. By way of another example, some disclosed examples achieve optical coupling of light from a laser into a fixed waveguide, which creates the possibility of employing an optically pluggable module. As another example, the inclusion of the tape automated substrate (TAB) 10 in the disclosed modules and methods is advantageous over inclusion of, for example, a solid state riser because the TAB 10 is an inexpensive way to achieve a vertical rise of an RF signal, the TAB 10 is easy to assembly into a package, the mounting of components on the TAB 10 may be easily automated, and the use of a TAB 10 may achieve better signal transmission than may be achieved by, for example, a ceramic riser because the TAB 10 can employ slight bends in the signal transmission path, as opposed to the more abrupt bends typically found in the ceramic riser.

Although certain example methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of manufacturing an optoelectronic module comprising:
   mounting a fiber submount to a substantially rigid substrate via a passive placement technique; and
   mounting a tape automated bonding substrate to the substantially rigid substrate after the fiber submount is mounted to the substantially rigid substrate.

2. A method as defined in claim 1, further comprising mounting a first component on a tape automated bonding substrate.

3. A method as defined in claim 2, wherein the first component does not have a high precision placement requirement.

4. A method as defined in claim 3, wherein the first component is a passive element.

5. A method as defined in claim 3, wherein the first component comprises at least one of: a resistor, a capacitor, an inductor, a thermistor, a laser driver, a power monitor, a monitor photo diode, and an RF circuit.

6. A method as defined in claim 2, wherein mounting the first component on the tape automated bonding substrate comprises surface mounting the first component.

7. A method as defined in claim 1 wherein the tape automated bonding substrate comprises a polyimide tape.

8. A method as defined in claim 1 further comprising mounting a laser submount to the substantially rigid substrate.

9. A method as defined in claim 8 wherein the laser submount comprises multiple layers.

10. A method as defined in claim 8 further comprising soldering the tape automated bonding substrate to RF interconnection pads on the laser submount.

11. A method as defined in claim 8 further comprising mounting a semiconductor laser to the laser submount.

12. A method as defined in claim 11 wherein the laser submount includes at least one fiducial mark.

13. A method as defined in claim 11 wherein the laser submount includes probe pads to activate the laser.

14. A method as defined in claim 8 wherein mounting the laser submount to the substantially rigid substrate comprises mounting the laser submount to the substantially rigid substrate via the passive placement technique.

15. A method as defined in claim 14 wherein the substantially rigid substrate includes at least one fiducial mark, and the passive placement technique comprises a machine vision technique.

16. A method as defined in claim 1 wherein the substantially rigid substrate includes an integral laser submount.

17. A method as defined in claim 1 further comprising mounting an optical fiber on the fiber submount.

18. A method as defined in claim 17 wherein mounting the optical fiber on the fiber submount comprises mounting the optical fiber within a v-groove defined in the fiber submount.

19. A method as defined in claim 1 wherein the substantially rigid substrate includes at least one fiducial mark, and the passive placement technique comprises a machine vision technique.

20. A method as defined in claim 1 further comprising mounting an optical fiber in a feedthrough mounted to a wall of the optoelectronic module.

21. A method as defined in claim 1 further comprising:
mounting a ferrule to the fiber submount; and
mounting an optical fiber within the ferrule, wherein the ferrule comprises a core of a pluggable optical connector.

22. A method as defined in claim 21 further comprising mounting the optical fiber within a v-groove defined in the fiber submount.

23. A method as defined in claim 21 wherein the optical fiber protrudes from the ferrule.

24. A method as defined in claim 1 further comprising mounting a flexure to the substantially rigid substrate.

25. A method as defined in claim 24 further comprising an optical lens coupled to the flexure.

26. A method as defined in claim 25 wherein mounting the flexure to the substantially rigid substrate further comprises monitoring an optical coupling efficiency to actively align the optical lens with a laser mounted on the substantially rigid substrate.

27. A method as defined in claim 26 wherein actively aligning the optical lens with the laser is the only active alignment employed to assemble the optoelectronic module.

28. A method as defined in claim 26 wherein actively aligning the optical lens with the laser comprises flexing the flexure to adjust a vertical position of the optical lens to maximize the optical coupling efficiency of an output of the laser through the optical lens.

29. A method as defined in claim 25 further comprising an isolator coupled to the flexure to substantially prevent light flow in a predetermined direction.

30. A method as defined in claim 25 wherein the optical lens comprises a first optical lens, and further comprising mounting a second flexure coupled to a second optical lens to the substantially rigid substrate.

31. A method as defined in claim 30 further comprising actively aligning the first optical lens with a laser mounted on the substantially rigid substrate and subsequently actively aligning the second optical lens with the laser.

32. A method as defined in claim 25 wherein the flexure is mounted to the substantially rigid substrate before the tape automated bonding substrate is mounted to the substantially rigid substrate.

33. A method as defined in claim 1 further comprising hermetically sealing the optoelectronic module.

34. A method as defined in claim 1 further comprising:
mounting a fixed mount coupled to a first optical lens to the substantially rigid substrate via the passive alignment technique; and
mounting a flexure coupled to a second optical lens to the substantially rigid substrate while monitoring an optical coupling efficiency to actively align the second optical lens with a laser.

35. A method as defined in claim 34 wherein mounting the flexure comprises flexing the flexure to adjust a vertical position of the second optical lens to maximize an output of the laser through the first and second optical lenses.

36. A method as defined in claim 1 wherein the fiber submount includes at least one fiducial mark.

37. A method as defined in claim 1 wherein the tape automated bonded substrate has a first portion mounted on the substantially rigid substrate and a second portion mounted on a laser submount.

38. A method as defined in claim 37 wherein the laser submount to the rigid substrate.

39. A method as defined in claim 37 wherein the laser submount is integral with the rigid substrate.

40. An optoelectronic module comprising:
a substantially rigid substrate;
a laser submount coupled to the substantially rigid substrate; and
a tape automated bonding substrate mounted to the rigid substrate.

41. An optoelectronic module as defined in claim 40 wherein the substantially rigid substrate comprises a ceramic substrate, the ceramic substrate having an intermediate layer having printed circuit lines, a bottom layer below the intermediate layer and a top layer above the intermediate layer.

42. An optoelectronic module as defined in claim 40 wherein the laser submount is secured to the substantially rigid substrate.

43. An optoelectronic module as defined in claim 40 further comprising a passive circuit element mounted to the tape automated bonding substrate.

44. An optoelectronic module as defined in claim 40 wherein the tape automated bonding substrate is mounted to the laser submount and to the rigid substrate.

45. An optoelectronic module as defined in claim 44 wherein the tape automated bonding substrate is electrically connected to the laser submount.

46. An optoelectronic module as defined in claim 40 further comprising a laser mounted to the laser submount.

47. An optoelectronic module as defined in claim 40 further comprising a fiber submount mounted to the substantially rigid substrate via a passive placement technique.

48. An optoelectronic module as defined in claim 47 wherein the fiber submount defines a v-groove dimensioned to receive an optical fiber.

49. An optoelectronic module as defined in claim 48 further comprising an optical fiber located in a feedthrough in a wall of the optoelectronic module.

50. An optoelectronic module as defined in claim 48 further comprising:
a ferrule mounted to the fiber submount; and
an optical fiber within the ferrule, wherein the ferrule comprises a core of a pluggable optical connector.

51. An optoelectronic module as defined in claim 40 further comprising a first flexure mounted to the substantially rigid substrate and a first optical lens coupled to the first flexure.

52. An optoelectronic module as defined in claim 51 wherein the first flexure is mounted to the substantially rigid substrate by actively aligning the first optical lens with a laser to maximize a coupling efficiency.

53. An optoelectronic module as defined in claim 51 further comprising at least one of a second lens and an isolator coupled to the first flexure.

54. An optoelectronic module as defined in claim 51 further comprising a second flexure mounted to the substantially rigid substrate and a second optical lens coupled to the second flexure.

55. An optoelectronic module as defined in claim 54 wherein the first optical lens is actively aligned with a laser and subsequently the second optical lens is actively aligned with the laser.

56. An optoelectronic module as defined in claim 40 further comprising:

a fixed mount coupled to a first optical lens, the fixed mount being mounted to the substantially rigid substrate via a passive alignment technique; and a flexure coupled to a second optical lens and mounted to the substantially rigid substrate via an active alignment process to align the second optical lens with a laser.

57. An optoelectronic module as defined in claim 40 wherein the laser submount is integrally formed with the substantially rigid substrate.

58. An optoelectronic module as defined in claim 40 wherein the tape automated bonding substrate has a first portion mounted on the substantially rigid substrate and a second portion mounted on the laser submount.

59. A method of manufacturing an optoelectronic module comprising:

mounting an optical fiber to a fiber submount coupled to a substantially rigid substrate;

mounting a first portion of a tape automated bonding substrate carrying a laser driver to the substantially rigid substrate and a second portion of the tape automated bonding substrate to a laser submount;

mounting a laser to the laser submount;

mounting a flexure to the substantially rigid substrate, the flexure being coupled to an optical lens; and performing an active alignment of the optical lens to couple light generated by the laser to the optical fiber, wherein the active alignment of the optical lens is the only active alignment employed to assemble the optoelectronic module.

60. A method as defined in claim 59 wherein mounting the laser to the laser submount comprises electrically connecting the laser to laser driver.

61. A method as defines in claim 59 further comprising mounting the fiber submount to the substantially rigid substrate via a passive placement technique.

62. A pluggable optoelectronic module comprising:

a housing;

a substantially rigid substrate located within the housing;

a laser coupled to the substantially rigid substrate;

a fiber submount coupled to the substantially rigid substrate and defining a v-groove dimensioned to receive an optical fiber;

a first flexure coupled to a first optical lens, the first optical lens being coupled to the substantially rigid substrate to align the first optical lens with the laser; and a male pluggable connector coupled to the housing and the optical fiber.

63. An optoelectronic module as defined in claim 62 further comprising a second flexure and a second optical lens, the second optical lens being aligned with the laser via an active alignment technique.

64. An optoelectronic module as defined in claim 62 further comprising a feedthrough in a wall of the optoelectronic module.

65. An optoelectronic module as defined in claim 56 further comprising:

a ferrule mounted to the fiber submount, wherein the ferrule comprises a core of the pluggable connector.

66. An optoelectronic module as defined in claim 62 wherein the first flexure is coupled to at least one of a second lens and an isolator.

67. An optoelectronic module as defined in claim 62 further comprising:

a fixed mount coupled to a second optical lens, the fixed mount being mounted to the substantially rigid substrate via a passive alignment technique.

68. An optoelectronic module as defined in claim 62 further comprising a tape automated bonding substrate having a first portion mounted on the substantially rigid substrate and a second portion mounted on a laser submount on which the laser is mounted.

69. A method of manufacturing an optoelectronic module comprising:

manufacturing a plurality of tape automated bonding substrate assemblies, each of the tape automated bonding substrate assemblies including a tape automated bonding substrate and at least one circuit;

testing the tape automated bonding substrate assemblies for defects;

disposing of or repairing any defective tape automated bonding substrate assemblies;

manufacturing a plurality of substantially rigid substrate assemblies, each of the substantially rigid substrate assemblies including a substantially rigid substrate and at least one of: a laser submount, a fiber submount, a laser or a fiber;

testing the substantially rigid substrate assemblies for defects;

disposing of or repairing any defective substantially rigid substrate assemblies; and mounting one of the tape automated bonding substrate assemblies that passed the testing to one of the substantially rigid substrate assemblies that passed the testing.

70. A method as defined in claim 69, wherein mounting one of the tape automated bonding substrate assemblies to one of the substantially rigid substrate assemblies further comprises: mounting a first portion of the tape automated bonding substrate to the substantially rigid substrate and a second portion of the tape automated bonding substrate to the laser submount of the substantially rigid substrate assembly.

* * * * *